A. SOMMER.
METHOD OF OBTAINING SPECIFIC GRAVITY.
APPLICATION FILED JUNE 12, 1909.
959,633.    Patented May 31, 1910.
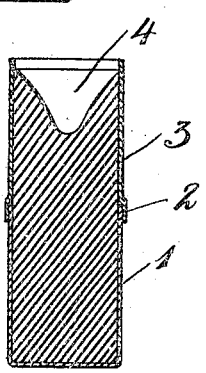
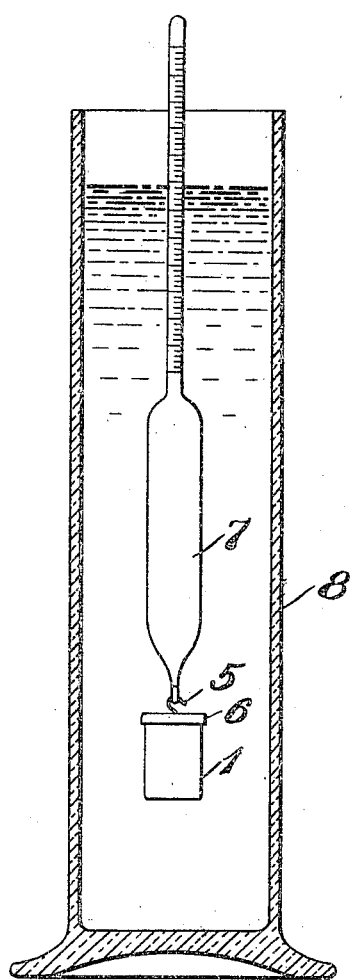
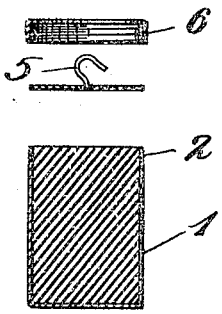
Witnesses:    Inventor
Chas. A. Peard.    Albert Sommer
Fred. M. Dannenfelser.    By his Attorneys
    Bartlett, Morrill & Mitchell

UNITED STATES PATENT OFFICE.

ALBERT SOMMER, OF NEW YORK, N. Y.

METHOD OF OBTAINING SPECIFIC GRAVITY.

959,633. Specification of Letters Patent. Patented May 31, 1910.

Application filed June 12, 1909. Serial No. 501,714.

*To all whom it may concern:*

Be it known that I, ALBERT SOMMER, a subject of the Emperor of Germany, residing at New York, county and State of New York, have invented certain new and useful Improvements in Methods of Obtaining Specific Gravity, of which the following is a full, clear, and exact description.

My invention relates to a method of obtaining the specific gravity of semi-liquid, or solid fusible substances, such as asphalt and the like, and has for its object to provide a simple method whereby such specific gravities can be readily and accurately determined.

It has heretofore been difficult to determine the specific gravity of semi-liquid and solid fusible bodies, because it has been difficult to accurately determine the mass of a portion of such a body when in the condition in which it is normally. Such masses are liable to have air bubbles in them when in normal condition, and, moreover, if melted and poured into a measuring receptacle, the volume when cooled will be less than the volume when liquid, and it is difficult to determine just how great is the difference in volumes when in these two conditions. I have observed that with a material such as asphalt in a vessel of proper shape, the adhesiveness is such that it will adhere to the sides while cooling, producing simply a depression in the upper surface when cooled. From this it results that if, after cooling, the upper portion of the mass is cut off at a definite point, such as flush with the top of the container, so as to leave a plain level surface, the remainder will be a mass of definite volume and its weight can be readily determined. I make use of these facts in my method and also make a new use of an areopycnometer.

The following is a description of my invention, reference being had to the accompanying drawings, which show how it is carried out.

Figure 1 is a view of a measuring device preferably used in carrying out my method. Fig. 2 shows the bottom portion with the contents leveled off, together with a hookplate and a ring for securing the same. Fig. 3 is a view of an areometer having a given volume of the mass affixed thereto and constituting a modified form of areopycnometer.

Referring more particularly to the drawings, 1 is a container or vessel having a screw-threaded portion 2, on which is screwed an extension 3. The container preferably has a capacity of ten (10) cubic centimeters. The container and a portion at least of the extension is filled with asphaltum or the like, poured in while melted. Upon cooling, a depression is formed, as at 4, by shrinkage. The sleeve or extension 3 is then removed and the top portion of the asphalt, extending above the vessel 1, is removed by a knife or other suitable instrument, so as to leave a plain surface flush with the upper edge of the vessel 1, as shown in Fig. 2. The filled container can then be weighed directly and the weight and specific gravity of its contents thus ascertained, the weight of the container when empty and its capacity having been previously ascertained the weight of contents being the difference between the weights of the container when it is full and when it is empty. However, the following method greatly simplifies the procedure:

After the plain surface is formed by cutting off the top, a hook 5 is connected on by a ring 6 and the container is suspended from the bottom of an aerometer 7 in a vessel 8, partially filled with water, or other liquid of known specific gravity. In this way the contents of the container is weighed. The distance to which the stem of the areometer is submerged furnishes the data for obtaining the specific gravity, namely, the submergence due solely to the amount within the container of the substance whose specific gravity is to be ascertained, the submergence of the instrument due to the hook 5, ring 6 and vessel 1 filled with water or the other liquids of known gravity having been before determined. The submergence due solely to the amount of the substance whose specific gravity is to be ascertained which remains within the container, is the difference between the other two submergencies referred to. The stem of the aerometer is graduated in any ordinary way, and may be graduated so that the specific gravity can be read directly thereon.

The method is accurate and direct and eliminates all errors that heretofore have been due to shrinkage on cooling, or to manipulation to remove air bubbles, or other similar sources.

What I claim is:

1. The improvement in the method of determining the specific gravity of semi-fluid and solid fusible substances which consists in filling a container with the substance whose specific gravity is to be ascertained in melted condition and retaining on the top thereof an amount of the substance sufficient to contain the cavity formed by cooling, cooling said substance, and thereafter removing the portion thereof which is outside of said container so as to leave a plain surface flush with the mouth of said container and ascertaining the weight of the remaining contents of said container while still within said container.

2. The improvement in the method of determining the specific gravity of semi-fluid and solid fusible substances which consists in filling a container with the substance whose specific gravity is to be ascertained in melted condition and retaining on the top thereof an amount of said substance sufficient to contain the cavity formed by cooling, cooling said substance, and thereafter removing the portion thereof which is outside of said container so as to leave a plain surface flush with the mouth of said container and supporting said container and its remaining contents from an aerometer in a liquid of known specific gravity and ascertaining the submergence of said aerometer.

ALBERT SOMMER.

Witnesses:
RUSSELL CALVI,
DAVID BROWN.